United States Patent [19]

Torregrosa

[11] Patent Number: 5,600,066

[45] Date of Patent: Feb. 4, 1997

[54] CAPACITIVE ACCELEROMETER WITH A CIRCUIT FOR CORRECTING STRAY CAPACITANCE PERTURBATIONS

[75] Inventor: Michel Torregrosa, Beaumont les Valence, France

[73] Assignee: Sextant Avionique, Cedex, France

[21] Appl. No.: 522,224

[22] Filed: Sep. 1, 1995

Related U.S. Application Data

[63] Continuation of Ser. No. 185,074, Jan. 18, 1994, abandoned.

[30] Foreign Application Priority Data

Jan. 19, 1993 [FR] France ..................... 93 00752

[51] Int. Cl.[6] ................. G01P 15/13; G01P 21/00; G01L 1/00
[52] U.S. Cl. ................. 73/514.18; 73/514.32; 73/862.61
[58] Field of Search .............. 73/514.18, 514.17, 73/514.32, 862.61, 1 D; 318/651, 662

[56] References Cited

U.S. PATENT DOCUMENTS

| | | | |
|---|---|---|---|
| 3,877,313 | 4/1975 | Ferriss | 73/517 B |
| 4,009,607 | 3/1977 | Ficken | 73/517 B |
| 4,345,474 | 8/1982 | Deval | 73/517 B |
| 4,353,254 | 10/1982 | Schroeder et al. | 73/517 B |
| 5,054,320 | 10/1991 | Yvon | 73/517 B |
| 5,095,752 | 3/1992 | Suzuki et al. | 73/517 B |
| 5,142,921 | 9/1992 | Stewart et al. | 73/517 B |
| 5,277,053 | 1/1994 | McLane et al. | 73/517 B |
| 5,343,766 | 9/1994 | Lee | 73/514.18 |
| 5,440,939 | 8/1995 | Barny et al. | 73/514.18 |

FOREIGN PATENT DOCUMENTS 38313593  3/1990  Germany.

Primary Examiner—Hezron E. Williams
Assistant Examiner—Helen C. Kwok
Attorney, Agent, or Firm— Lowe, Price, LeBlanc & Becker

[57] ABSTRACT

An accelerometer includes a silicon capacitive detector and an electronic device for measuring the capacitive unbalance of the detector, providing an output voltage representative of the acceleration. To avoid the perturbations caused by the stray capacitances present in the detector, there is provided a compensation system for injecting into the measurement system a predetermined correcting electric signal so that the output voltage of the accelerometer is substantially proportional to the ratio between the difference and the sum of the capacitances of the detector's capacitors.

8 Claims, 6 Drawing Sheets

5,600,066

CAPACITIVE ACCELEROMETER WITH A CIRCUIT FOR CORRECTING STRAY CAPACITANCE PERTURBATIONS

This application is a continuation of application Ser. No. 08/185,074 filed Jan. 18, 1994 now abandoned.

BACKGROUND OF THE INVENTION

1. Field of the Invention

The present invention relates to accelerometers including a silicon capacitive acceleration detector, and to a method for measuring the capacitive unbalance of the detector, providing an electric signal representative of an acceleration.

2. Discussion of the Related Art

A schematic exemplary silicon capacitive acceleration detector is illustrated in the cross-sectional view of FIG. 1. Detector 1 includes a central silicon plate 2 sandwiched between two external silicon plates 3 and 4. The central silicon plate 2 is etched prior to being assembled so as to include a frame 5 and a central plate, or pendulous mass 6, that is fastened to frame 5 by one or more holding arms 7. The insulation of the frame 5 of the central plate from the external plates 3 and 4 is provided by insulating strips 8 and 9, generally of silicon oxide. The external plates 3 and 4 delineate with frame 5 a space within which is suspended the pendulous mass 6. The upper and lower surfaces of the pendulous mass 6, as well as the surfaces of plates 3 and 4 facing the pendulous mass 6, include conductive surface areas, or electrodes 10, 11, 12, 13, forming a system including two capacitors Cs, Ci that are symmetrically disposed with respect to the median plane of detector 1. Electrodes 10–13 are accessed through contact pads and internal connections (not shown in FIG. 1). Usually, the mobile electrodes 10 and 11 are not insulated from the pendulous mass 6 (they are then doped silicon areas) and are at the same potential; so, a single contact pad is provided for electrodes 10 and 11.

When the device is at rest, capacitors Cs and Ci have substantially an equal value, as follows:

$$cs=ci=\epsilon S/do$$

where $\epsilon$ is the dielectric constant of the gas present in detector 1, S is the surface area of electrodes 10–13, and do is the distance separating, at rest, the pendulous mass 6 from each external silicon plate 3 and 4.

When the device withstands an acceleration, the pendulus mass 6 moves, with respect to its null position, by a quantity z proportional to the acceleration. In this case, capacitors Cs and Ci vary and have the following values:

$$Cs=\epsilon S/(do+z) \qquad (1)$$

$$Ci=\epsilon S/(do-z) \qquad (2)$$

where z is an algebraic length, whose sign is conventionally determined.

To measure acceleration, a system for measuring the unbalance of capacitors Cs and Ci is combined with the above described detector.

FIG. 2 represents the electric diagram of a conventional accelerometer 20 including the above-described detector 1 and such a measurement system. Detector 1 is represented by the two capacitors Cs and Ci that are formed by electrodes 10, 12 and 11, 13; the pad common to electrodes 10 and 11 being represented by a node 14. The measurement system includes an excitation unit 21 for exciting capacitors Cs and Ci, that is fed by a reference a.c. voltage v, a unit 30 for processing the signal from the detector, providing a measuring voltage vs, and a feedback loop 26 connecting voltage vs at the input of the excitation unit The excitation unit 21 drives the fixed electrode of capacitor Cs through a differential amplifier 22, and the fixed electrode 3 of capacitor Ci through a summing amplifier 23. The negative input of amplifier 22 and a first input of amplifier 23 are connected to an amplifier 24 having a gain b, receiving the reference voltage v. The positive input of amplifier 22 and the second input of amplifier 23 are connected to the output of an amplifier 25 having a gain a, receiving the voltage vs provided by the processing unit 30 through the feedback loop 26.

The processing unit 30 mainly includes a current/voltage converter 3 having its input connected to node 14, followed by an amplifier 33 having a very high gain G, providing the measuring voltage vs. In FIG. 2, converter 31 is schematically represented by an operational amplifier 32 having its output connected to its input through a capacitor having a capacitance Cr.

Voltage vs is used as the output voltage of the measurement system. Voltage vs is rectified in a demodulator 40 that is connected to the output of the feedback loop 26 and synchronized with voltage v, and that provides a voltage Us constituting the output signal of the accelerometer.

The above description shows that the excitation unit 21 applies to the fixed electrodes 12 and 13 of capacitors Cs and Ci excitation voltages, avs–bv and avs+bv, respectively. The input of the current/voltage converter 31 collects a differential current from node 4 resulting from the excitation of capacitors Cs and Ci. At the output of the processing unit 30, voltage vs is:

$$vs=K(Cs-Ci)/(Cs+Ci), \qquad (3)$$

where K is a constant.

The theoretical advantage of such a measurement system is that the amplitude of voltage vs is proportional to displacement z of the pendulous mass 6 of the detector and, hence, to the acceleration. In combining equations (1), (2) and (3), it can be appreciated that vs=K z/do.

However, in this prior art accelerometer, the measurement of the displacements of the pendulous mass is actually significantly affected by the presence of high stray capacitances present in the detector, to such an extent that the output signal Us obtained by demodulation of voltage vs is erroneous. Thus, it is noted that the output signal does not linearly increase as acceleration increases, in contrast to what is expected from the above theoretical equation (3). Such stray capacitances (labeled as C1 and C2 in FIG. 2) are predominantly formed in the region of the insulation layers 8 and 9 between frame 5 of the central silicon plate 2 and the corresponding surfaces of the external plates 3 and 4.

To avoid this drawback, various technological approaches, aiming at modifying the detector structure in order to reduce stray capacitances, have been proposed. However, these technological approaches involve an increase in the cost and/or the complexity of the detector.

The applicant proposes a fully different approach, consisting in reducing the influence of the stray capacitances in the measurement system instead of modifying the structure of the conventional detectors.

SUMMARY OF THE INVENTION

Thus an object of the present invention is to provide an accelerometer in which the impairing effect of the stray capacitances on the linearity of the output signal is compensated for.

To achieve this object, the present invention provides an accelerometer including a silicon capacitive detector forming a system including two variable capacitors whose capacitive unbalance is dependent upon acceleration, the capacitors being impaired by parallel stray capacitances; and an electronic device for measuring the capacitive unbalance of the detector, providing an output voltage representative of the acceleration. The electronic device includes an excitation unit to apply to the capacitors excitation voltages generated by the weighted combination of a reference voltage with the output voltage; a current/voltage converter unit to collect currents from each capacitor, providing a measuring voltage; a feedback loop to connect back the measuring voltage to the excitation unit, the output voltage being drawn from the output of the feedback loop. The accelerometer includes a compensation unit for compensating the impairing effect of the stray capacitances, for injecting into the measurement system a correcting electric signal generated from the reference and measuring voltage, and chosen so that the output voltage is substantially proportional to the ratio between the difference and the sum of the capacitors' capacitances.

According to an embodiment of the invention, the compensation unit injects into the feedback loop a correction voltage that is selected so that the output voltage is equal to the weighted sum of the measuring voltage and reference voltage, the weighting coefficients of the weighted sum being adjustment parameters of the compensation unit.

Advantageously, the compensation unit includes an operational amplifier disposed in series in the feedback loop and connected as an adder, the amplifier output being connected to its input through a first resistor, the measuring voltage and reference voltage being applied to the same input through a second and a third resistor, respectively, the ratio between the first and second resistor and the ratio between the first and third resistors constituting the adjustment parameters of the compensation unit.

The reference voltage, measuring voltage and output voltage can be a.c. voltages or d.c. voltages. In the latter case, the excitation unit includes switches for chopping the excitation voltages applied to the capacitors, the converter unit includes a current/voltage converter followed by a demodulator.

According to another embodiment of the invention, the converter unit injects at the input of the compensation unit a correcting current that is added to the currents drawn from the capacitors, and is selected to cancel the current generated by the excitation of the stray capacitances.

Advantageously, the correcting current is drawn from two compensation capacitors that are excited by voltages respectively equal to the difference and to the sum of a voltage proportional to the reference voltage plus or minus a voltage proportional to the measuring voltage, the excitation voltages of the compensation capacitors constituting the adjustment parameters of the compensation unit.

Advantageously, the reference voltage, the output voltage and the measuring voltage are d.c. voltages, the excitation voltages of the detection capacitors and of the compensation capacitors being chopped by switches operating in phase opposition, the converter unit including a current/voltage converter followed by a demodulator having a very high static gain.

Preferably, the compensation capacitors include a sandwich formed by a silicon oxide layer and two silicon plates.

The foregoing and other objects, features, aspects and advantages of the invention will become apparent from the following detailed description of the present invention when taken in conjunction with the accompanying drawings.

BRIEF DESCRIPTION OF DRAWINGS

FIG. 3b illustrates in more detail a block of FIG. 3a;

FIG. 4 represents an alternative embodiment of the accelerometer of FIG. 3a.

DETAILED DESCRIPTION

Figure 1:
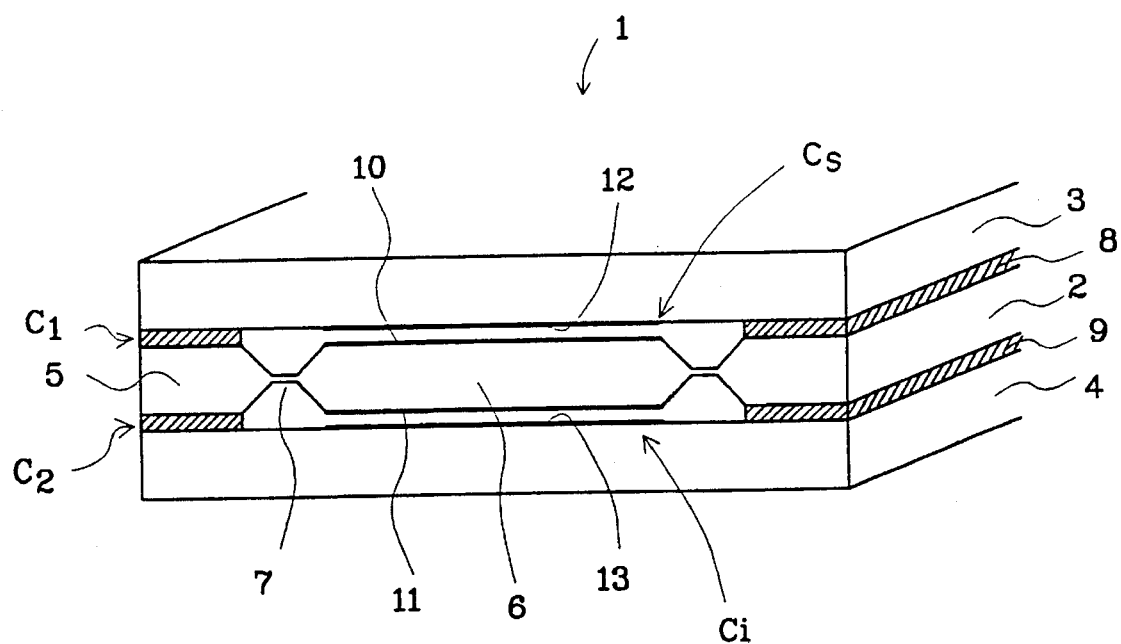
FIGS. 1 and 2, above described, respectively represent a schematic cross-sectional view of a silicon capacitive detector and the electric diagram of a prior art accelerometer.
Figure 2:
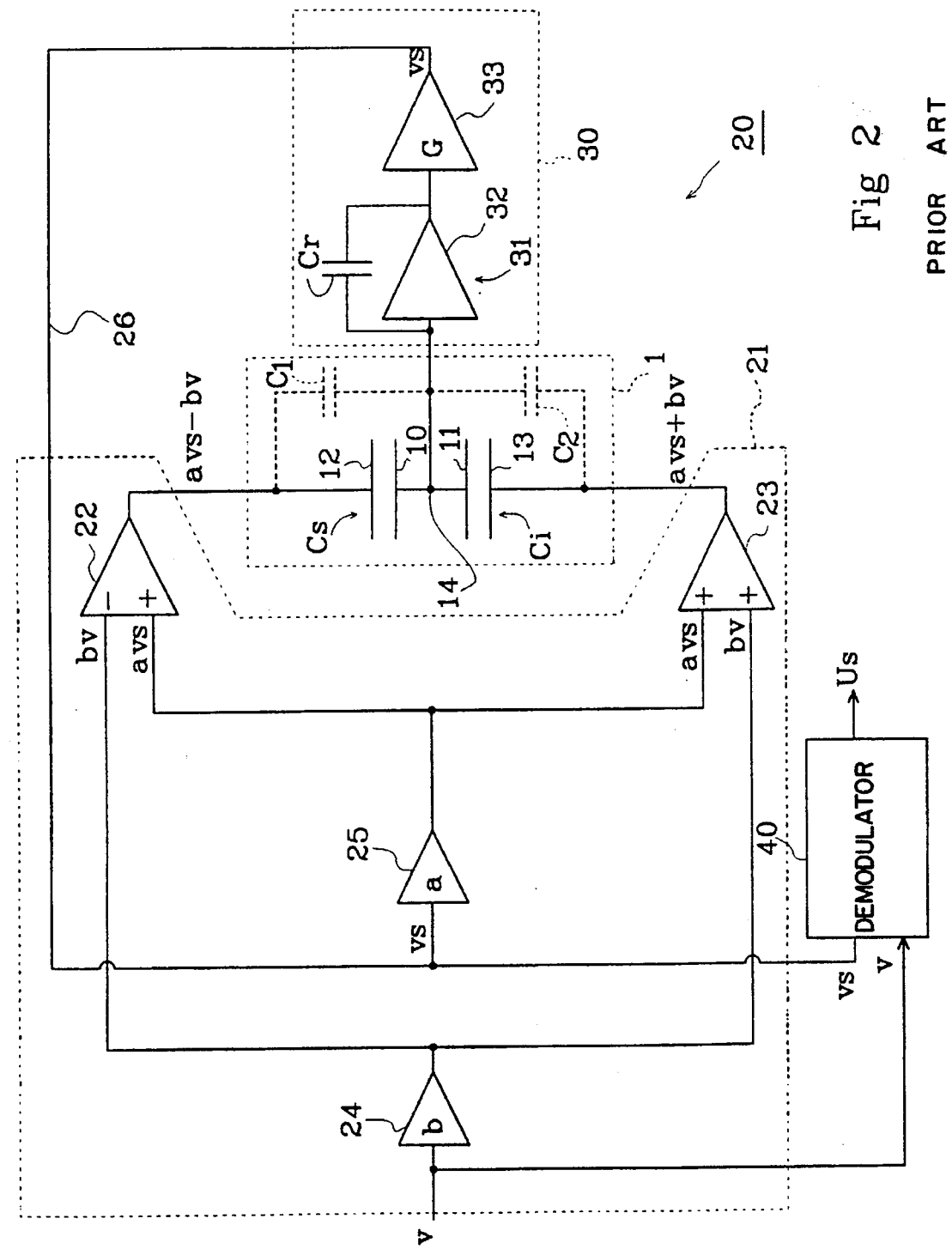

The invention is based on a study of the perturbations generated by stray capacitances in a prior art accelerometer. The accelerometer 20 illustrated in FIG. 2 will serve as an example. As seen in FIG. 2, the stray capacitances can be represented by a capacitor C1 disposed in parallel with capacitor Cs, and a capacitor C2 disposed in parallel with capacitor Ci, so that the excitation voltages (avs−bv, avs+bv) applied to capacitors Cs and Ci also act on capacitors C1 and C2. Under these conditions, the "true" equation giving the output voltage vs is:

$$(Cr/G)vs = avs(Cs+Ci) - bv(Cs-Ci) + avs(C1+C2) - bv(C1-C2). \quad (4)$$

Neglecting the perturbation introduced by the stray capacitances (that is, considering that C1=C2=0), and selecting an amplifier 25 with a very high gain G, equation (4) is simplified and equation (3) of the prior art is again true:

$$vs = K(Cs-Ci)/Cs+Ci) \quad (3)$$

where K=(b/a)v.

As explained above, equation (3) is representative of the linearity of the output voltage vs or, in other words, of the proportionality between the amplitude of the output voltage vs and the displacements z of the pendulous mass 6. Equation (3) also indicates that the measurement capacitors are excited at a constant charge, and that no parasitic electrostatic force, liable to draw the pendulous mass 6 near the fixed electrodes and to impair the linearity of the output voltage vs, is generated.

Thus, the present invention predominantly aims at re-establishing equation (3) in the system defined by equation (4), in which the stray capacitances C1 and C2 are taken into account.

To achieve this purpose, the invention provides for adding to the prior art accelerometer a compensation unit injecting into the measurement system an electric signal for correcting the perturbations caused by the stray capacitances. Hereinafter, two embodiments of the present invention will be described. According to the first embodiment, the correcting signal is a voltage, introduced upstream of the detection capacitors Cs, Ci, and added to the excitation voltages thereof. In the second embodiment, the correcting signal is a current, introduced downstream of capacitors Cs and Ci, at the input of the processing unit 30.

FIRST EMBODIMENT: adding a voltage compensation unit to the measurement system.

Figure 3A:
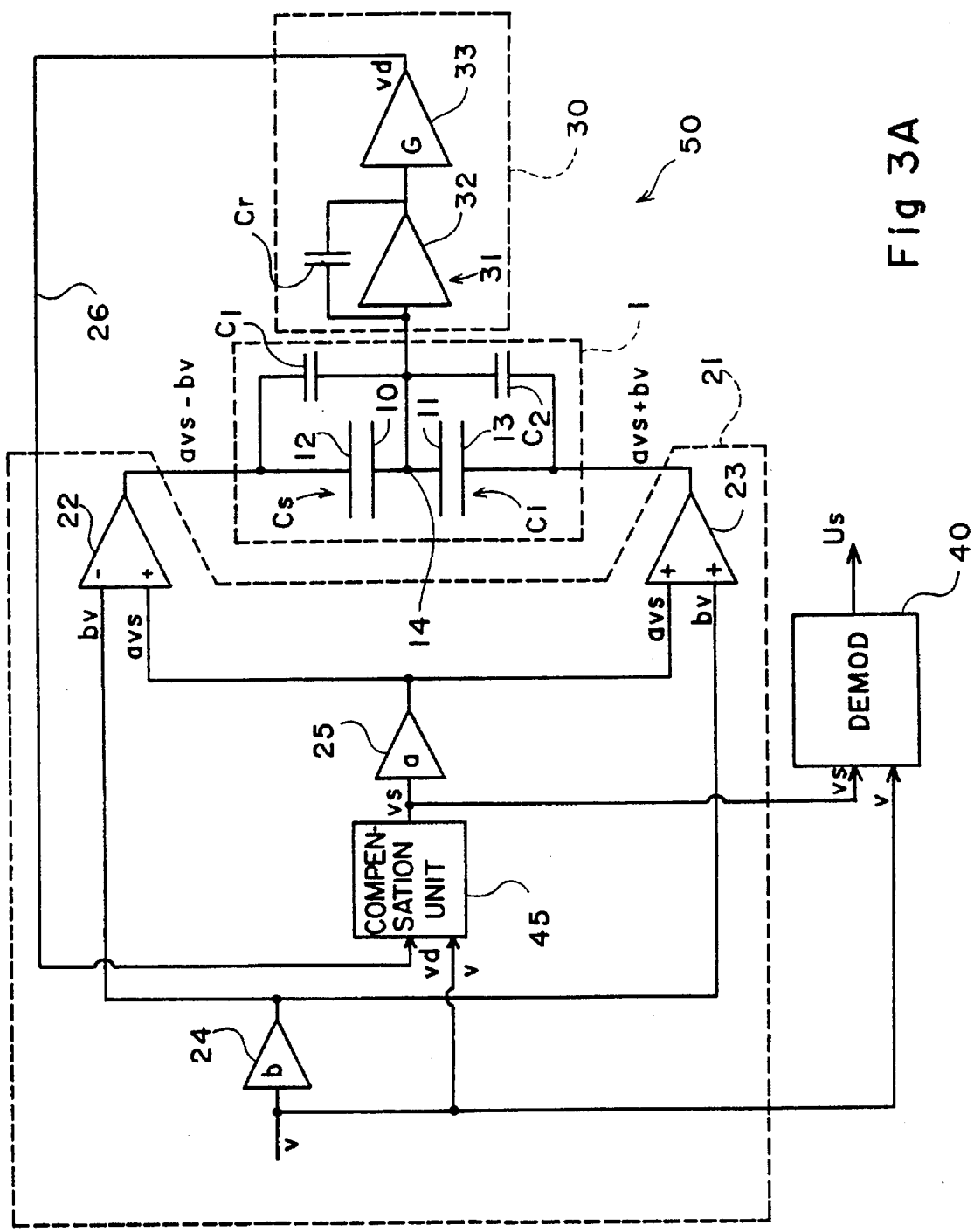
FIG. 3a is an electric block diagram of an accelerometer according to the invention.

FIG. 3a represents the electric diagram of an accelerometer 50, according to the invention that differs from the conventional accelerometer of FIG. 2 only by the provision of a compensation unit 45. For the sake of simplicity, the components that are common to FIG. 2 are labeled with the same reference characters and will not be described again.

The compensation unit 45 is introduced into the feedback loop 26 applying to the excitation unit 21 the measuring voltage (now labeled vd) provided by the processing unit 30, the output voltage vs being drawn at the output of the feedback loop 26, after the compensation unit 45, and is conventionally applied to amplifier 25 and to demodulator 40. Thus, the compensation unit 45 implements the following function f:

$$vs=f(vd).$$

Under these conditions, the above equation (4) applies to voltage vd and is:

$$(Cr/G)vd=avs(Cs+Ci)-bv(Cs-Ci)+avs(C1+C2)-bv(C1-C2). \quad (5)$$

To compensate for the impairing effect of the stray capacitances, the invention provides that the compensation unit 45 implements following equation (6):

$$(Cr/G)vd=avs(C1+C2)-bv(C1-C2). \quad (6)$$

In this case, by combining equation (5) with equation (6), equation (5) can be simplified and becomes:

$$avs(Cs+Ci)-bv(Cs-Ci)=0, \quad (5)$$

that is, $$vs=(bv/a)\,(CS-Ci)/(Cs+Ci). \quad (5)$$

Equation (5) becomes equivalent to equation (3), and the linearity of the output voltage vs is re-established despite the presence of stray capacitances, vs being proportional to the displacements z of the pendulous mass 6 and, therefore, to the acceleration.

Thus, it is appreciated that the perturbations caused by the stray capacitances in the measurement system are compensated for when equation (6) is achieved. Equation (6) is arranged to let appear the function vs=f(vd) of the compensation unit 45:

$$vs=f(vd)=\frac{vd}{aG}\;\frac{Cr}{(C1+C2)}+\frac{bv}{a}\;\frac{(C1-C2)}{(C1+C2)} \quad (6)$$

or, in a simplified form:

$$vs=Avd+Bv, \quad (6)$$

where $$A=\frac{1}{aG}\;\frac{Cr}{(C1+C2)}\;\text{and}\;B=\frac{b}{a}\;\frac{(C1-C2)}{(C1+C2)}.$$

Figure 3B:
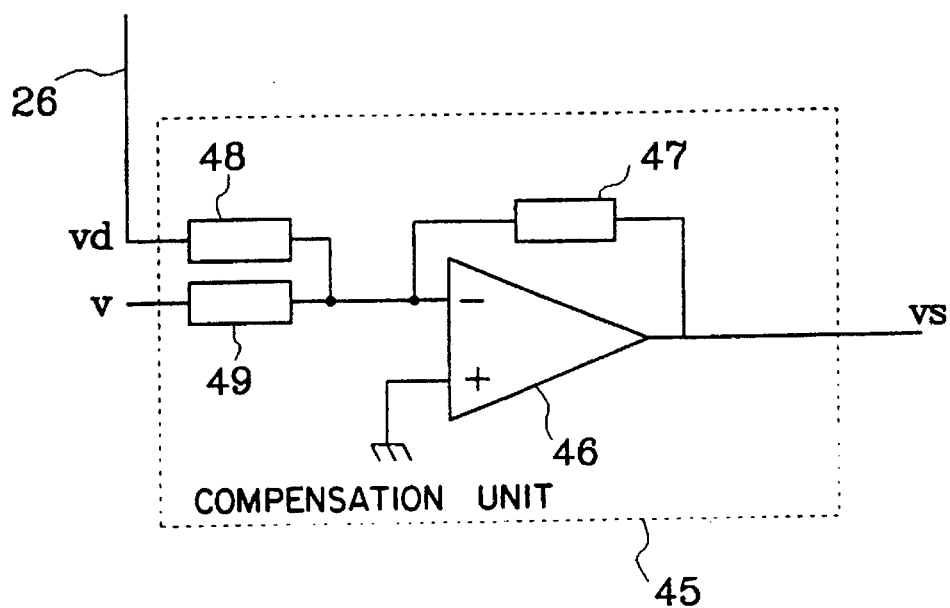

An exemplary embodiment of the compensation unit 45 is schematically illustrated in FIG. 3b. Unit 45 includes an operational amplifier 46 having its output connected back to its negative input through a resistor 47. Voltages vd and v are applied at the input of amplifier 46 through resistors 48 and 49, respectively. Resistors 47, 48 and 49 are adjusted so that:

R47/R48=A and

R47/R49=B.

In practice, unit 45 can be adjusted through calibration on a testing stand or during construction, once the stray capacitances have been theoretically or experimentally determined.

By examining the equations providing gains A and B of the compensation unit 45, those skilled in the art will appreciate that amplifier 33 need not, in the present case, have a very high gain G. Indeed, equation (3) giving the linearity of the output voltage vs no longer depends on term G. Finally, gain G, gain a of amplifier 25, and gain b of amplifier 24 are adjustment parameters of the accelerometer. A particularly simple embodiment consists in considering that a, b, and G are equal to 1.

Additionally, voltage avs must be strictly in phase with voltages bv and -by so that accelerometer 50 adequately operates. Those skilled in the art will be able to take steps so that the sum of the phase shifting introduced by the various elements of accelerometer 50 satisfy this requirement.

Figure 4:
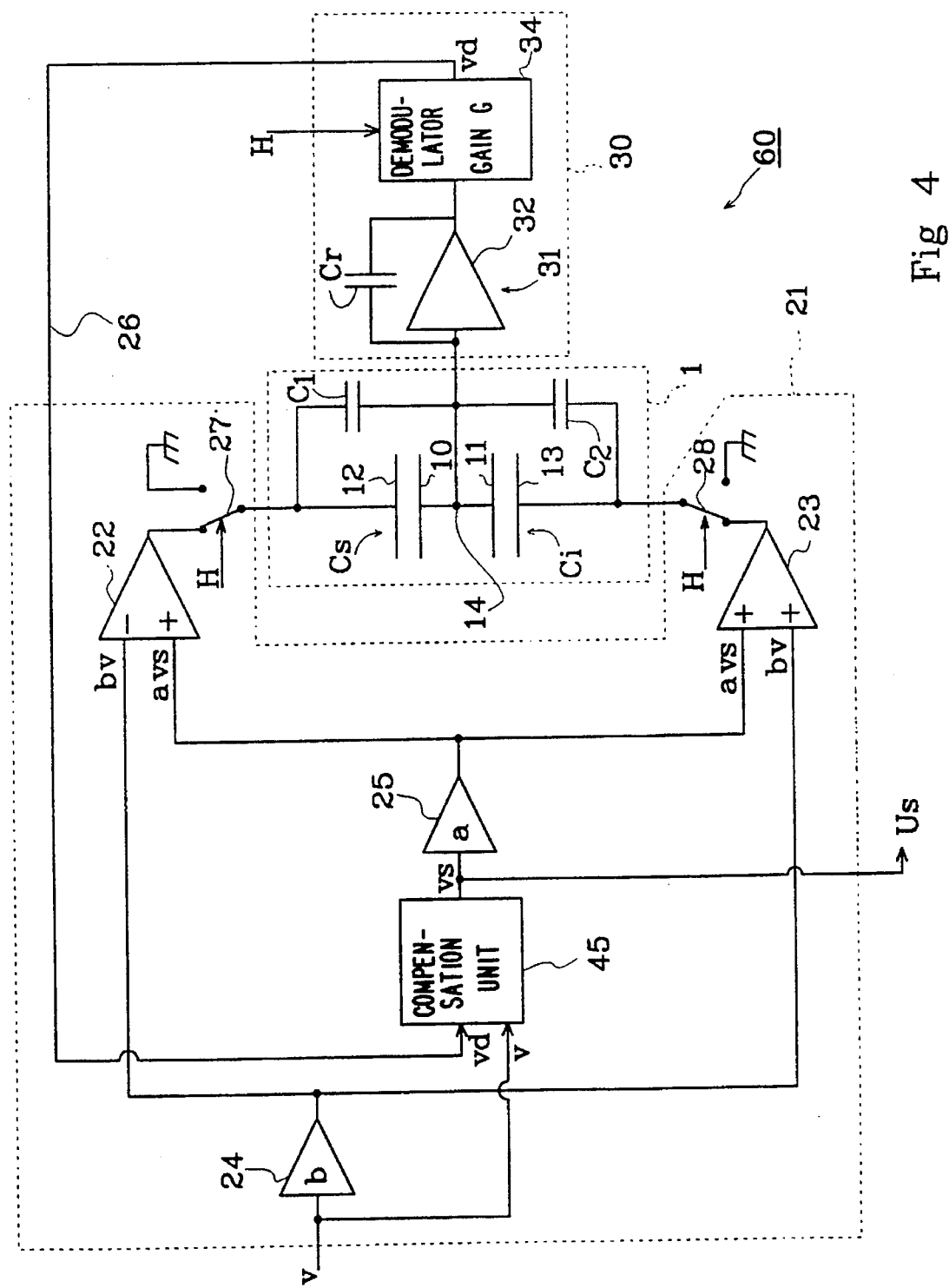

FIG. 4 shows an accelerometer 60 that is an alternative embodiment of the accelerometer of FIG. 3a, with the further advantage of being insensitive to possible phase shift problems. In accelerometer 60, the various voltages vs, v, avs, by, and vd are d.c. voltages. The various elements forming the excitation unit of the system of FIG. 3a are maintained, and are labeled with the same reference characters. Amplifiers 22 and 23 of the excitation unit 21 provide d.c. voltages avs−bv, avs+bv, respectively. These voltages are chopped by switches 27, 28 (for example, MOS transistors) that are controlled by a clock signal H, prior to being applied in the form of square waves to capacitors Cs and Ci. The processing unit 30 receiving the current from capacitors Cs and Ci includes the above current/voltage converter 31, amplifier 33 being replaced by a demodulator 34 having a static gain G, synchronized with the clock signal H. Voltage vd from demodulator 34 is applied to the compensation unit 45 according to the invention (above described with reference to FIG. 3b), operating in the present example in a d.c. mode. The output voltage vs from the compensation unit 45 is directly usable as an output signal Us.

The accelerometer 60 operates in the same manner as the accelerometer 50 of FIG. 3a; the above equations (5) and (6) being still valid.

Figure 3C:
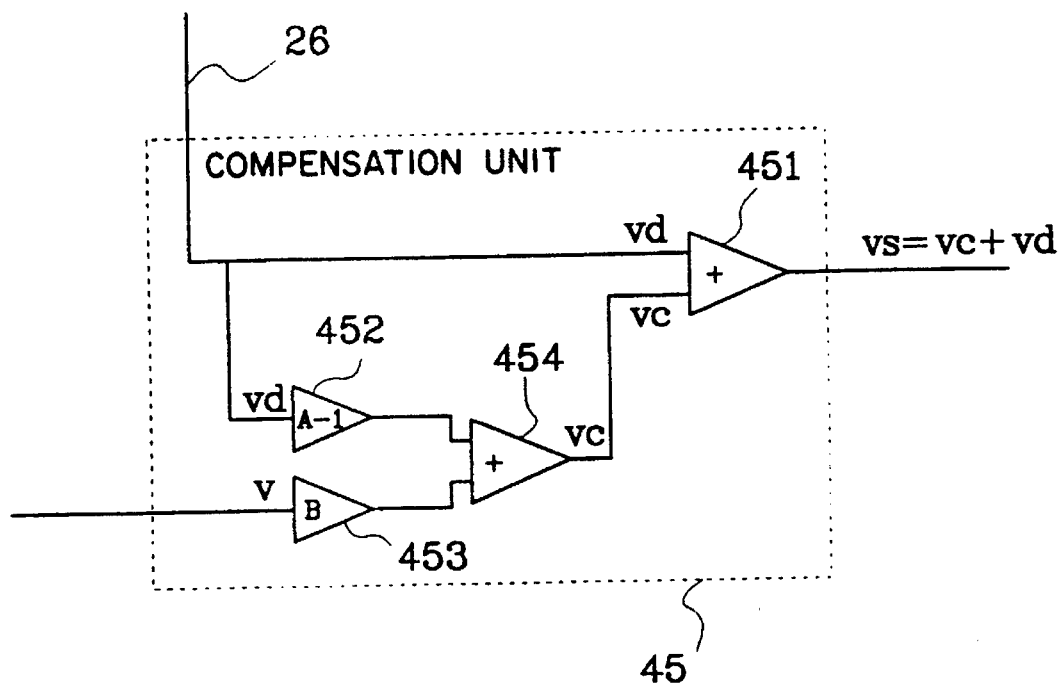
FIG. 3c is an equivalent diagram of the block of FIG. 3b.

It should be noted that the function vs=f(vd) achieved by the compensation unit 45 corresponds to adding to the measurement signal vd provided by the processing unit 30 a correction signal vc=(A−1)vd+Bv, which, combined with voltage vd, provides voltage vs. Thus, the compensation unit 45 can be represented by the general diagram of FIG. 3c, in which unit 45 includes a first amplifier 452 having a gain A−1 and receiving vd, a second amplifier 453 having a gain B and receiving v, and a summing amplifier 454 receiving the outputs of amplifiers 452 and 453 and providing the correction signal vc, vc being injected into the feedback loop 26 through an adder 451 receiving vc and yd.

SECOND EMBODIMENT: adding a current compensation unit to the measurement system.

It is reminded that the above-described equation (4) defines the "true" equation of the output voltage of a conventional measurement system, in the presence of stray capacitances C1 and C2.

In this embodiment of the invention, a current I is injected at the input of the processing unit so that equation (4) is modified and becomes:

$$(Cr/G)vs=avs(Cs+Ci)-bv(Cs-Ci)+avs(C1+C2)-bv(C1-C2)-I. \quad (7)$$

To compensate for the perturbations caused by the stray capacitances, I is made equal to:

$$I=avs(C1+C2)-bv(C1-C2). \tag{8}$$

(For the sake of simplicity, in equations (7) and (8). A conventional term expressing the periodicity of signals, if the signals are sine-wave signals, is eliminated. Thus, term I has the dimension of a current divided by a periodicity term, and represents an electric charge).

Advantageously, it is also devised that current I is provided by two compensation capacitors Cn1 and Cn2, that are excited by voltages cvs–dv and cvs+dv, respectively, c and b being adjustment coefficients. So, I is:

$$I=cvs(Cn1+Cn2)-dv(Cn1-Cn2). \tag{9}$$

The adjustment coefficients c and d, and also possibly a and b, are chosen so that equation (8) is true. In this case, in equation (7), the terms C1 and C2 are eliminated by the compensation current I. If G is chosen very high, equation (7) becomes:

$$avs(Cs+Ci)-bv(Cs-Ci)=0. \tag{10}$$

It can be seen that equation (10)=equation (3) and that the linearity of the output voltage vs is reached.

Figure 5:
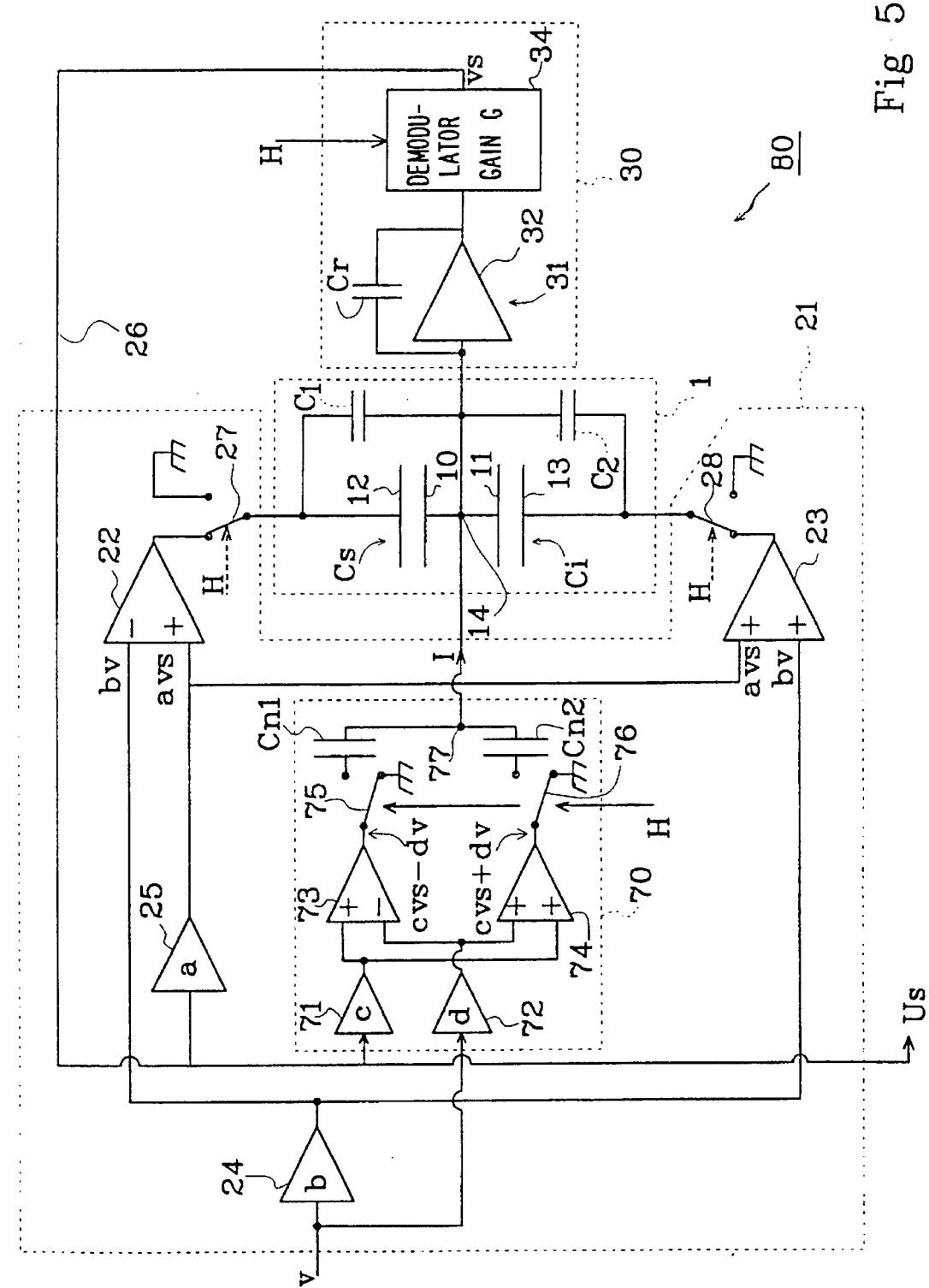
FIG. 5 is an electric diagram of an alternative embodiment of an accelerometer according to the invention.

FIG. 5 represents the electric diagram of an accelerometer 80 including a current compensation unit 70. Accelerometer 80 includes the above-described excitation unit 21 and the processing unit 30, that operate in the present example by chopping d.c. voltages. Thus, amplifiers 22 and 23 connect capacitors Cs and Ci through two switches 27 and 28 synchronized with the clock signal H; the processing unit 30 includes the demodulator 34 that has, in the present case, a very high static gain G. The reference voltage v of the excitation unit 21 that is applied to amplifier 24 is a d.c. voltage, and voltage vs provided by the demodulator 34 acts as an output signal Us of the accelerometer 80.

The compensation unit 70 according to the invention is mounted in parallel with the excitation unit 21 and detector 1. Unit 70 receives voltage vs from the feedback loop 26, and the reference voltage v. The output o unit 70 is connected to node 14, that is, to the input of the processing unit 30, and provides a current I for correcting the impairing effect of the stray capacitances. unit 70 includes, at its input, an amplifier 71 having a gain c, receiving voltage vs, and an amplifier having a gain d, receiving voltage v. The output of amplifier 71 is connected to the positive input of a differential amplifier 73 and to an input of a summing amplifier 74. The output of amplifier 72 is connected to the negative input of amplifier 73 and to the second input of amplifier 74. The output of amplifier 73 drives a first compensation capacitor Cn1 through a chopping switch 75, and the output of amplifier 74 drives a second compensation capacitor Cn1 Cn2 through a chopping switch 76. Switches 75 and 76 are synchronized with the clock signal H and operate in phase opposition with switches 27 and 28 of the excitation unit 21. Common terminals of capacitors Cn1 and Cn2 are connected to a node 77 that constitutes the output of the compensation unit 70, node 77 being connected to node 14.

The observation of the electric diagram of the compensation unit 70 shows that it substantially constitutes a duplication of the excitation unit 21 and of detector 1, and similarly operates. Indeed, amplifiers 73 and 74 of the compensation unit provide d.c. voltages cvs–dv and cvs+dv that are chopped by switches 75 and 76 prior to being applied to capacitors Cn1 and Cn2 and, similarly, amplifiers 22 and 23 of the excitation unit provide d.c. voltages avs–bv and avs+bv that are chopped by switches 27 and 28 prior to being applied to capacitors Cs and Ci. Therefore, node 14 provides the sum of a current generated by the excitation of Cs and Ci and of a spurious current generated by the excitation of C1 and C2, decreased by the value of the compensation current I (in phase opposition) provided by unit 70 and generated by capacitors Cn1 and Cn2 (current I is defined by equation (9)).

The expression of the output voltage vs provided by accelerometer 80 is given by equation (7) and also depends upon the sum of currents at node 14. As explained above, the effect of the stray capacitances is compensated for in accelerometer 80 by selecting parameters a, b, c, d, so that the equality of equation (8) is reached. Like the voltage compensation unit described with reference to FIGS. 3a and 4, the current compensation unit of FIG. 5 can be adjusted through calibration on a testing plant, or during construction, once the stray capacitances have been theoretically or experimentally determined.

A particularly advantageous embodiment of the compensation unit 70 consists in providing compensation capacitors Cn1 and Cn2 of the same technology as the detector, and preferably having capacitances close to C1 and C2 in order to have the same thermal variations. Thus, the system is adequately compensated for, whatever be its operation temperature.

Those skilled in the art will note that the accelerometer 80 also operates with a.c. voltages v and vs. In this case, chopping switches 27, 28, 75, and 76 are eliminated, and demodulator 34 is replaced with an amplifier having a very high gain G. Also, current I must be phase-shifted by 180° and the output voltage vs must be demodulated to obtain signal Us.

In practice, the various systems according to the invention provide very satisfactory results. Experiments carried out by the applicant have evidenced that the voltage compensation systems allow for the correction of about 90% of the non linearity of the accelerometer output signals in a range of temperature from –55° C. to 125° C., the current compensation systems allowing to reach a correction of approximately 95% with the use of compensation capacitors Cn1 and Cn2 fabricated in the same technology as detector 1. The second type of system is slightly more expensive to fabricate, while remaining more advantageous than the prior art systems which consist in modifying the structure of the detector to decrease C1 and C2.

Various modifications can be made to the above described embodiments of the invention, more particularly for the practical implementation of the electric diagrams.

In the above, it has been considered that the output signal Us of the accelerometer is an electric signal. In practice, it is possible to add to the accelerometer means for transforming the output signal into a signal of a different nature, for example optical, or for encoding the output signal.

The invention can also apply to detectors including several pairs of measurement capacitors that are disposed in parallel, this type of detectors being electrically equivalent to a two-capacitor detector.

Last, it will be apparent to those skilled in the art that the two compensation (voltage or current) modes provided by the present invention are equivalent both for the result they provide and for the function they achieve. Indeed, the analysis of the compensation mechanisms involved shows that each case of injection of a correction signal into the measurement system in fact corresponds to an injection of weighted electric charges compensating for the effect of electric charges produced by the stray capacitances.

I claim:
1. An accelerometer including:
   a silicon capacitive acceleration detector comprising a pair of complementary acceleration sensitive capacitors connected to a common node between first and second terminals, said pair of capacitors having respective parallel connected stray capacitances;

a compensation unit for reducing an impairing influence of said stray capacitances, said unit providing an acceleration representative signal equal to a sum of a reference signal and of a measuring signal corresponding to a signal at said common node, wherein the reference signal and the measuring signal are weighted respectively by first and second coefficients;

first circuitry for applying to said first terminal a signal equal to the difference between the acceleration representative signal and the reference signal, wherein the acceleration representative signal and the reference signal are weighted respectively by third and fourth coefficients; and second circuitry for applying to said second terminal a signal equal to the sum of the acceleration representative signal and of the reference signal, wherein the acceleration representative signal and the reference signal are weighted respectively by said third and fourth coefficients.

2. The accelerometer of claim 1, wherein said compensation unit includes an operational amplifier connected as an adder, an output of the amplifier being connected to a first input of the amplifier through a first resistor, the reference signal and the measuring signal being voltages applied to the first input through second and third resistors respectively, a ratio between the first and the second resistors and a ratio between the first and the third resistors respectively equalling said first and second coefficients.

3. The accelerometer of claim 1, wherein the reference signal, the measuring signal and the acceleration representative signal are a.c. voltages.

4. The accelerometer of claim 1, wherein the reference signal, the measuring signal and the acceleration representative signal are d.c. voltages, wherein switches are provided for chopping the terminals of said capacitors.

5. An accelerometer including:

a silicon capacitive acceleration detector comprising a pair of complementary acceleration sensitive capacitors connected to a common node between first and second terminals, said pair of capacitors having respective parallel connected stray capacitances;

first circuitry for applying to said first terminal a signal equal to the difference between an acceleration representative signal corresponding to a signal at said common node and a reference signal, wherein the acceleration representative signal and the reference signal are weighted respectively by first and second coefficients;

second circuitry for applying to said second terminal a signal equal to the sum of the acceleration representative signal and of the reference signal, wherein the acceleration representative signal and the reference signal are weighted respectively by said first and second coefficients; and a compensation unit for reducing an impairing influence of said stray capacitances, said unit providing to said common node a signal equal to the difference between the acceleration representative signal and the reference signal, wherein the reference signal and the acceleration representative signal are weighted respectively by a coefficient proportional to the difference between the stray capacitances and by a coefficient proportional to the sum of the stray capacitances.

6. The accelerometer of claim 5, wherein said compensation unit comprises two compensation capacitors connected to said common node between third and fourth terminals provided respectively with the difference and the sum of said acceleration representative signal and of said reference signal, wherein said reference signal and said acceleration representative signal are weighted respectively by third and fourth coefficients.

7. The accelerometer of claim 6, wherein said reference signal and said acceleration representative signal are d.c. voltages, the signals provided to the first and second terminals of the acceleration sensitive capacitors and to the third and fourth terminals of the compensation capacitors being chopped by switches operating in phase opposition, the compensation unit including a demodulator having a very high static gain.

8. The accelerometer of claim 6, wherein said compensation capacitors include a sandwich formed by a silicon oxide layer and two silicon plates.

* * * * *